(12) United States Patent
Baughman et al.

(10) Patent No.: US 11,037,576 B2
(45) Date of Patent: Jun. 15, 2021

(54) DISTRIBUTED MACHINE-LEARNED EMPHATIC COMMUNICATION FOR MACHINE-TO-HUMAN AND MACHINE-TO-MACHINE INTERACTIONS

(71) Applicant: International Business Machines Corporation, Armonk, NY (US)

(72) Inventors: Aaron K. Baughman, Silver Spring, MD (US); Mauro Marzorati, Lutz, FL (US); Gary Francis Diamanti, Wake Forest, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

(21) Appl. No.: 16/192,327

(22) Filed: Nov. 15, 2018

(65) Prior Publication Data

US 2020/0160870 A1  May 21, 2020

(51) Int. Cl.
| | | |
|---|---|---|
| *G10L 17/26* | (2013.01) | |
| *G10L 15/30* | (2013.01) | |
| *G10L 15/18* | (2013.01) | |
| *G06N 20/00* | (2019.01) | |
| *G10L 17/04* | (2013.01) | |

(Continued)

(52) U.S. Cl.
CPC ............... *G10L 17/26* (2013.01); *G06N 20/00* (2019.01); *G10L 15/1815* (2013.01); *G10L 15/26* (2013.01); *G10L 15/30* (2013.01); *G10L 17/00* (2013.01); *G10L 17/04* (2013.01); *G10L 17/22* (2013.01); *H04L 51/02* (2013.01); *H04M 3/2281* (2013.01); *H04M 3/4936* (2013.01); *G10L 2015/227* (2013.01); *H04M 2203/2027* (2013.01); *H04M 2203/6027* (2013.01)

(58) Field of Classification Search
CPC ........ G06N 20/00; G06N 20/20; H04L 51/02; H04L 51/20; H04M 3/4936; H04M 3/2281; H04M 2203/6027; H04M 2203/2027; G10L 2015/227; G10L 25/51
USPC ................................. 704/231–257, 270–275
See application file for complete search history.

(56) References Cited

U.S. PATENT DOCUMENTS

| | | |
|---|---|---|
| 6,341,267 B1 | 1/2002 | Taub |
| 6,651,044 B1 | 11/2003 | Stoneman |

(Continued)

OTHER PUBLICATIONS

Goncalves et al. "Assessing user's emotion at interactions time; a multimodal approach with multiple sensors". Soft Computing 21, 5309-5323, published online Mar. 21, 2016 (Year: 2016).*

(Continued)

*Primary Examiner* — Jesse S Pullias
(74) *Attorney, Agent, or Firm* — Garg Law Firm, PLLC; Rakesh Garg; James Nock

(57) ABSTRACT

A system determines if a call participant of a call between the call participant and a voice response system is a human or a machine. Responsive to determining that the call participant is a human, an emotional state of the call participant is determined. Environmental information of an environment associated with the call participant is receiving. A receptiveness level of the call participant is determined based upon the emotional state and the environmental information. A message to the call participant is determined based upon the receptiveness level and one or more machine-learning models.

20 Claims, 6 Drawing Sheets

(51) Int. Cl.
  G10L 17/22  (2013.01)
  H04L 12/58  (2006.01)
  H04M 3/493 (2006.01)
  H04M 3/22  (2006.01)
  G10L 15/26  (2006.01)
  G10L 17/00  (2013.01)
  G10L 15/22  (2006.01)

(56) References Cited

U.S. PATENT DOCUMENTS

| | | | |
|---|---|---|---|
| 7,251,606 B2 | 7/2007 | Horinaka et al. | |
| 7,360,151 B1 | 4/2008 | Froloff | |
| 2004/0249510 A1* | 12/2004 | Hanson | G06F 19/00 700/245 |
| 2008/0310398 A1* | 12/2008 | Jain | G10L 25/78 370/352 |
| 2008/0310604 A1* | 12/2008 | Agarwal | G06Q 30/02 379/88.18 |
| 2013/0095460 A1* | 4/2013 | Bishop | G09B 19/00 434/308 |
| 2014/0270108 A1 | 9/2014 | Riahi et al. | |
| 2015/0003595 A1* | 1/2015 | Yaghi | H04M 3/5175 379/85 |
| 2015/0213800 A1 | 7/2015 | Krishnan et al. | |
| 2017/0300291 A1* | 10/2017 | Lee | G06F 3/165 |
| 2018/0090137 A1 | 3/2018 | Horling et al. | |
| 2018/0174457 A1* | 6/2018 | Taylor | G08G 1/0962 |
| 2018/0232563 A1* | 8/2018 | Albadawi | A61B 5/117 |

OTHER PUBLICATIONS

Zoraida Callejas et al., Affective Conversational Agents: The Role of Personality and Emotion in Spoken Interactions, Abstract, p. 8,10,11, 2011; IGI Global, University of Granada.

* cited by examiner

US 11,037,576 B2

DISTRIBUTED MACHINE-LEARNED EMPHATIC COMMUNICATION FOR MACHINE-TO-HUMAN AND MACHINE-TO-MACHINE INTERACTIONS

TECHNICAL FIELD

The present invention relates generally to a method, system, and computer program product for machine-to-human and machine-to-machine interactions. More particularly, the present invention relates to a method, system, and computer program product for distributed machine-learned emphatic communication for machine-to-human and machine-to-machine interactions.

BACKGROUND

Interactive voice response (IVR) systems allow a computer to interact with a human through the use of voice and dual-tone multi-frequency (DTMF) input via a keypad. Typically, IVR systems allow a customer to interact with a company's host computer system via voice recognition or a telephone keypad to request information or services such as ordering products, inquiring about user account information, or making payments. The IVR system typically interacts with the caller using pre-recorded or dynamically generated responses to provide information or direct the caller how to proceed. While interacting with the IVR system, the IVR system typically guides the user in an interactive manner through a set of predetermined flows. Higher level services can vary greatly in capability from interactive telephonic services to question and answer (Q&A) based systems such as cognitive chat services or chat robots.

SUMMARY

The illustrative embodiments provide a method, system, and computer program product. An embodiment of a computer-implemented method includes determining if a call participant of a call between the call participant and a voice response system is a human or a machine, and responsive to determining that the call participant is a human, determining an emotional state of the call participant. The embodiment includes receiving environmental information of an environment associated with the call participant, and determining a receptiveness level of the call participant based upon the emotional state and the environmental information. The embodiment includes determining a message to the call participant based upon the receptiveness level and one or more machine-learning models.

Another embodiment further includes receiving metadata associated with the call participant, wherein determining the receptiveness level is further based upon the metadata. In another embodiment, the metadata includes one or more of a location associated with the call participant or a time of day associated with the call.

Another embodiment further includes providing the message to the call participant. Another embodiment further includes receiving a response to the message from the call participant. Another embodiment further includes updating the one or more machine-learning models based upon the response.

In another embodiment, wherein the emotional state of the call participant includes one or more of a mood, an emotion, a social propensity or a language style of the call participant. In another embodiment, the environmental information is received from one or more sensor devices located in the environment of the call participant. In another embodiment, the one or more sensor devices includes one or more of a wearable device associated with the call participant, an audio sensing device, or a visual sensing device.

Another embodiment further includes, responsive to determining that the call participant is a machine, determining a physical state of the call participant. IN another embodiment, the message is configured to likely increase the receptiveness level of the call participant.

In another embodiment, configuring the message includes one or more of modifying a word or phrase of an original message, modifying a volume level of the message, or modifying a tone of the message.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
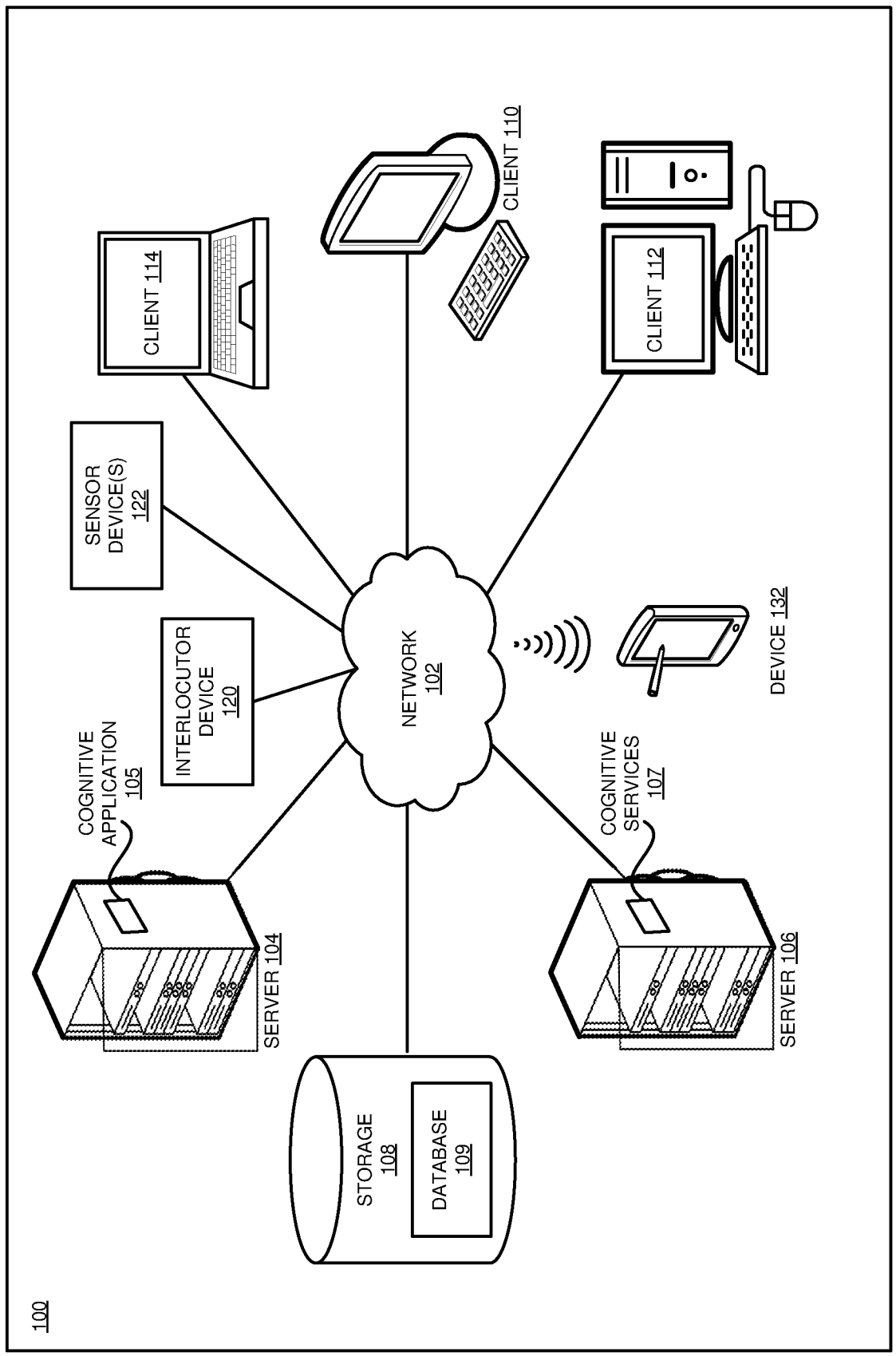
FIG. 1 depicts a block diagram of a network of data processing systems in which illustrative embodiments may be implemented.

The illustrative embodiments described herein are directed to distributed machine-learned emphatic communication for machine-to-human and machine-to-machine interactions. One or more embodiments recognize that existing interactive voice response systems do not allow for determining an emotional state of a user to allow providing appropriate emphatic responses during an interaction to emulate types of responses that a compassionate person would provide. Embodiments recognize that providing a human-like emotional experience during interactions with a machine by being able to determine the emotional state of users and provide programmatic empathetic responses to connect with an audience in a positive manner. Embodiments recognize that tailoring responses based upon an emotional state of a user allows, for example, for changing the user experience from being negative to being positive, calming an upset customer by providing an appropriate response, showing compassion for a sick caller, or provide a polite sales experience by responding to the user "I can tell your very busy, would you have a moment now, or would you prefer I call you back at a more convenient time?"

One or more embodiments provide for the capability for intelligent automated response systems, such as robotic personal assistants or IVRs, to provide empathetic responses for machine-to-human communication and machine-to-machine communication. One or more embodiments provide for the capability to determine if an interlocutor participating in a conversation with the system is a human or a machine, e.g., whether the system is communicating with another machine, such as an automated service, or a human. In various embodiments described herein, an interlocutor is a human or machine participating in a dialogue or conversation with the system.

Particular embodiments are directed to a call pattern in which a robotic device initiates a call and the system determines whether the receiver of the call is a human or another robotic device. Examples of robotic device initiated calls include, but are not limited to, sales calls, healthcare calls, and scheduling for appointments. Other particular embodiments are directed to a call pattern in which a robotic device receives a call and the system determines that the receiver is a human user requesting non-confidential data such as product support or interaction with a chat bot. Other particular embodiments are directed to a call pattern in which a robotic device receives a call, the system determines that the caller is a human user requesting confidential data, and the system confirms the identity of the human user. Other particular embodiments are directed to a call pattern in which a robotic device receives a call and the system determines that the caller is another robotic device such as a household appliance.

In an embodiment, a cognitive application determines an emotional state of a user (e.g., an interlocutor) during an automated voice or text based interaction between the user and a machine and captures available environmental information and metadata to provide a tailored positive empathetic response to the user. In the embodiment, the environmental information and/or metadata is received from sensor devices such as wearables devices associated with the interlocutor, microphones or other audio sensing devices, and video feeds or other visual sensing devices within the environment of the interlocutor.

In the embodiment, the cognitive application interrogates the interaction between a machine and the interlocutor to determine if the machine is interacting with a human or another automated system. If the interlocutor is determined to be a human, the cognitive application captures the emotional and available environmental information about the interlocutor. In the embodiment, the cognitive application utilizes cognitive services, such as personality, insights, and tone determination cognitive services, to determine emotional state and other parameters such as mood, emotion, social propensity, and language styles associated with the interlocutor. In particular embodiments, the cognitive application uses one or more of visual recognition to interrogate images captured through video from the user wearable devices or other sensors, sound recognition from non-verbal auditory cues that is captured during an interaction to determine an interlocutor's stress level as well as emotional state. Example non-verbal auditory cues may include sounds indicative of a potentially stressful condition such as emergency sirens, high speed traffic from a freeway, crowd noise from a bar or a social event, clicks of a keyboard, a baby crying or a dog barking profusely. Examples of metadata may include a location of a call, a time of day factoring in the interlocutor being awakened, or calls that interrupt a mealtime.

In the embodiment, the cognitive application uses the captured metadata and other environmental data to determine an interlocutor's receptiveness level. In particular embodiments, the cognitive application utilizes algorithms to calculate a user's attention level or receptiveness level as well as compression and comprehension level from the metadata and/or other environmental data. Examples of data that may indicate a user's attention level or receptiveness level include a length of time for a user to respond to a question from the system, the user asking for information to be repeated.

In the embodiment, based on parameters such as the user's mood, emotion, social propensity and language styles coupled with visual and sound pattern recognition, the cognitive application creates emphatic responses to improve the receptiveness of the communication provided to the user to improve the interactive experience. In particular embodiments, the cognitive application not only provides empathetic messages but may also alter volume, velocity of speech, tone and slang to provide that empathy is received by the user.

If the interlocutor type is determined to be a robotic device, the cognitive application obtains data from the interlocutor device to determine a manner of altering return messaging to provide an emphatic experience using techniques such as cognitive services to determine mood, emotion, social propensity, and language styles of the interlocutor device, metadata such as location of a call, a time of day, of subject matter of the interaction.

In the embodiment, the cognitive application uses the captured metadata to determine effectiveness of the communication with the interlocutor device. In the embodiment, the cognitive application determines an attention or receptiveness level of the interlocutor device. In the embodiment, the cognitive application determines a response style and emotion based on evaluation of the communication style and persona of the robotic device. In particular embodiments, the cognitive application not only provides empathetic messages but may also alter volume, velocity of speech, tone and slang to provide that empathy is received by the user.

An embodiment can be implemented as a software application. The application implementing an embodiment can be configured as a modification of an existing automatic response system or platform, as a separate application that operates in conjunction with an existing automatic response system or platform, a standalone application, or some combination thereof.

The illustrative embodiments are described with respect to certain types of automated voice response systems, cognitive services, cognitive applications, tools and platforms, emotional and physical state determining procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
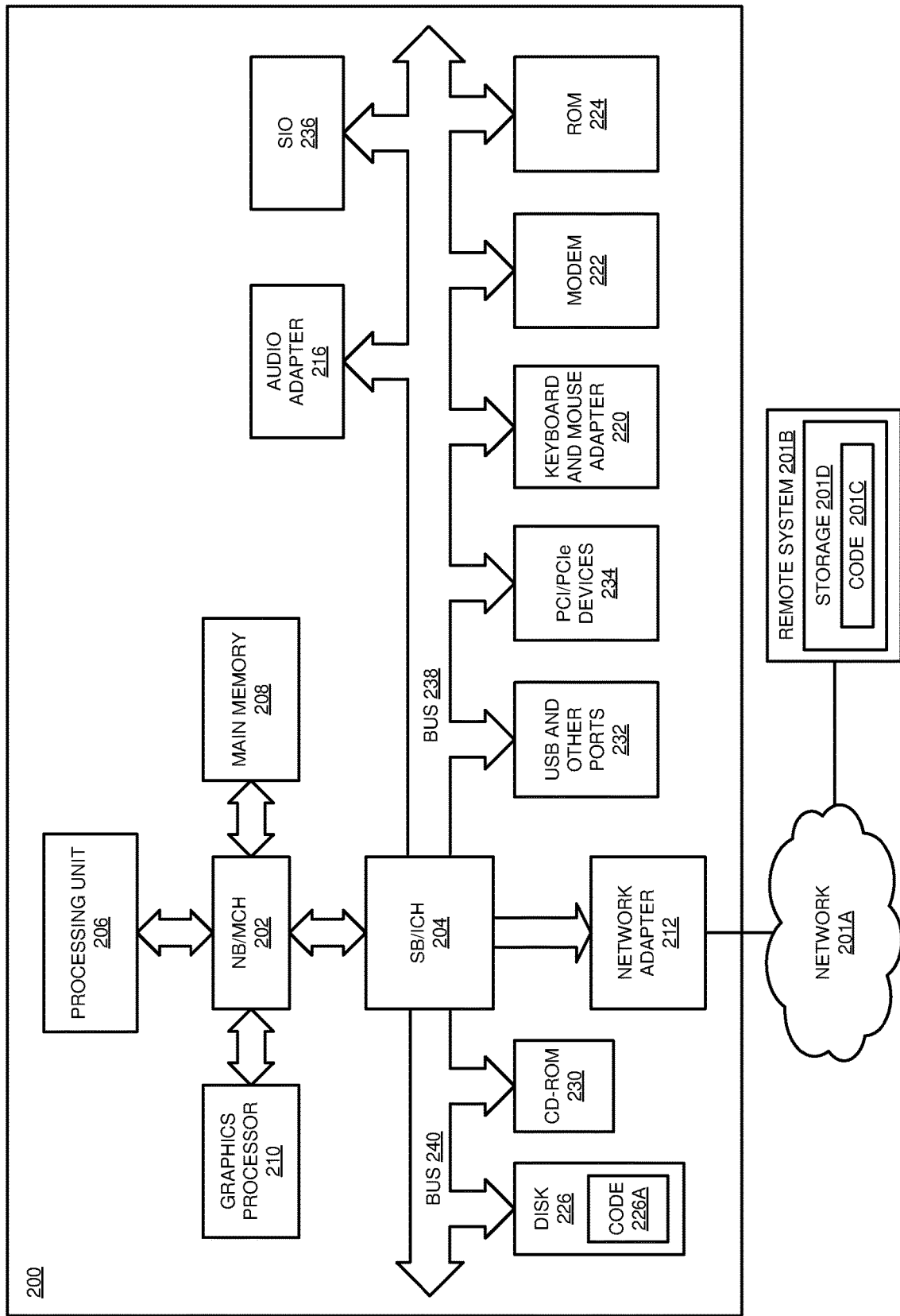
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes a cognitive application 105 that may be configured to implement one or more of the functions described herein for distributed machine-learned emphatic communication for machine-to-human and machine-to-machine interactions in accordance with one or more embodiments. Server 106 includes one or more cognitive services 107 such as personality, insights, and tone determination cognitive services, to determine emotional state and other parameters such as mood, emotion, social propensity, and language styles associated with the interlocutor as described herein.

Storage device 108 includes one or more databases 109 configured to store a corpus of training data and models as described herein. An interlocutor device 120 is coupled to network 102 and configured to allow an interlocutor such as a human or machine to interact with an automatic voice response system such as a robotic device as described herein. One or more sensor devices 122 such as wearable devices, audio capture devices, video capture devices, and other IoT devices, are coupled to network 102 and configured to capture data within an environment associated with an interlocutor indicative of an emotional state, physical state of the interlocutor during an interaction as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
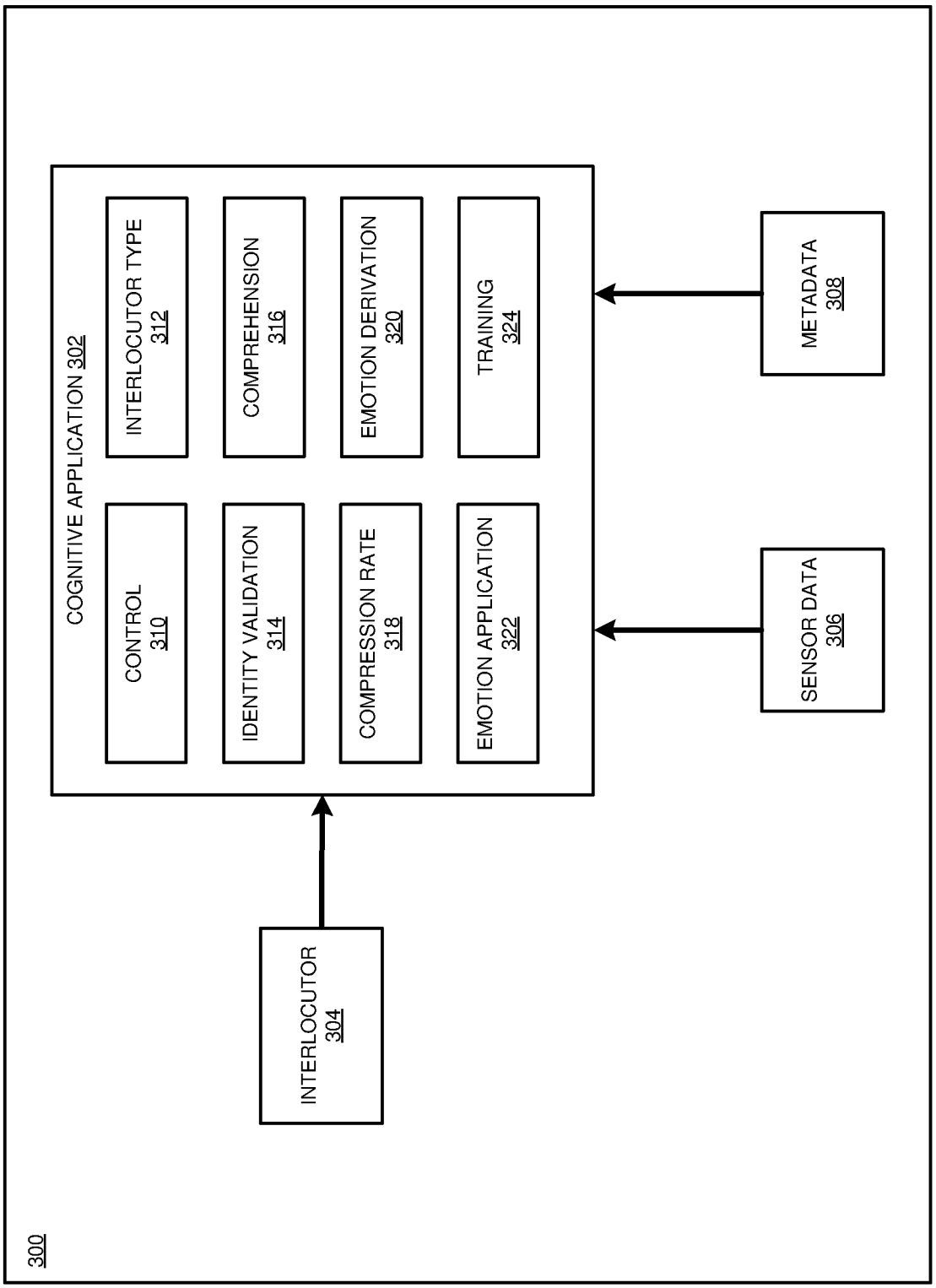
FIG. 3 depicts a block diagram of an example configuration for distributed machine-learned emphatic communication for machine-to-human and machine-to-machine interactions in accordance with an illustrative embodiment.

With reference to FIG. 3, this figure depicts a block diagram of an example configuration 300 for distributed machine-learned emphatic communication for machine-to-human and machine-to-machine interactions in accordance with an illustrative embodiment. The example embodiment includes a cognitive application 302. In a particular embodiment, cognitive application 302 is an example of application 105 of FIG. 1.

Cognitive application 302 is configured to manage an interactive experience of an interlocutor 304 and a robotic device such as an interactive voice response system and produce an empathetic experience to the interlocutor. Cognitive application 302 is further configured to collect and consuming one or more of data from a dialogue of an interaction, sensor data 306 including data feeds from sensor devices such as wearable devices, environmental sensors, and non-verbal auditory cues during interactions with the interlocutor. Cognitive application 302 further receives metadata 308 associated with interlocutor 304 such as location data and time of day data.

Cognitive application 302 includes a control component 310, an interlocutor type determination component 312, an identity validation component 314, a comprehension determination component 316, a compression rate determination component 318, an emotion derivation component 320, an emotion application component 322, and a training component 324. Control component 310 is configured to control operations between interlocutor type determination component 312, identity validation component 314, comprehension determination component 316, compression rate determination component 318, emotion derivation component 320, emotion application component 322, and training component 324.

Interlocutor type determination component 312 is configured with an algorithm to perform a series of checks to interrogate the interaction with interlocutor 304 to determine if interlocutor 304 is a human or a machine such as another automated robotic device. Identity validation component 314 is configured to validate a user's (e.g., the interlocutor's) identity when the robotic device has confidential information to be shared with a specific person. In a particular embodiment, identity validation component 314 has access to user data files of the user to pose a series of security questions to validate the user's identity.

Comprehension determination component 316 is configured to interrogate responses of interlocutor 304 during an interaction and determine an attention level value of interlocutor 304 based upon the user's responses. In a particular embodiment, comprehension determination component 316 determines a comprehension level of interlocutor 304 as a percentage. In particular embodiments, comprehension determination component 316 is configured to analyze how interlocutor 304 is responding to the interaction by measuring one or more of whether interlocutor 304 responded to a particular interaction, a timeliness of interlocutor 304 responding to the interaction, and whether it was necessary for the system to repeat questions to obtain a response from interlocutor 304. In a particular embodiment, comprehension determination component 316 ascertains a level of receptiveness of interlocutor 304 to receiving information and participating in the exchange of information.

Compression rate determination component 318 is configured to receive responses from interlocutor 304 and determine a compression rate of the speech of interlocutor 304 to look for consistency as well as an amplitude level to provide a determination of an emotional and/or physical state of interlocutor 304. A compression rate within the context of an interaction refers to a length of a time interval in which interlocutor 304 (e.g., the user) provides responses during the interaction and/or a length of a time interval between responses during the interaction. In particular examples, compression rate determination component 318 may use the compression rate of the speech of the interlocutor 304 to determine whether interlocutor 304 is calm, agitated, or walking and potentially out of breath. In one or more embodiments, compression rate determination component 318 is configured to determine whether interlocutor 304 responds at a noticeably different velocity than the robotic device or service. In particular embodiments, the system determines the manner in which the system responds to interlocutor 304 based at least in part upon the compression rate of the speech of interlocutor 304.

Emotion derivation component 320 is configured to access one or more cognitive services to obtain user state parameter values of interlocutor 304 such as personality, insight, and tone and determine an emotional state of interlocutor 304. Examples of user state parameters include, but are not limited to emotional state (e.g., anger, disgust, fear, joy and sadness), social propensities (e.g., openness, conscientiousness, extroversion, agreeableness, and emotional range), and language styles (e.g., analytical, confident and tentative). Emotion derivation component 320 uses the user state parameter values coupled with sensor data 306 from the environment (e.g., wearables, video, and non-verbal sounds) to determine a weighting of the key emotions that are present during the interaction and a prevalent emotion present during the interaction. In one or more embodiments, cognitive application 302 uses an understanding of the combinations of emotions to provide a more appropriate type of response to interlocutor 304 during the interaction. For example, a significant difference in empathy may exist for a user that is angry and sad than a user that is angry and agitated. In one or more embodiments, the set of emotions are used by cognitive application 302 to formulate an empathetic response using trained machine models.

In the embodiment, emotion application component 322 receives the interlocutor type flag (H=human or R=robotic device) from interlocutor type determination component 312, the comprehension level from comprehension determination component 316, the compression rate of speech from compression rate determination component 318, and the emotional state from emotion derivation component 320. In the embodiment, emotion application component 322 determines one or more responses to the user having empathy and with response patterns that will be best received by the user based upon the above inputs. In particular embodiments, each interlocutor type (e.g., human or robotic device) has unique response patterns and training data sets that are used to create the empathetic responses.

In the embodiment, training component 324 is configured to control providing of data to one or more machine learning algorithms and triggering model training of one or more models to allow data from interactions to train the system to further refine the providing of a polite empathetic experience during interactions with a user.

Figure 4:
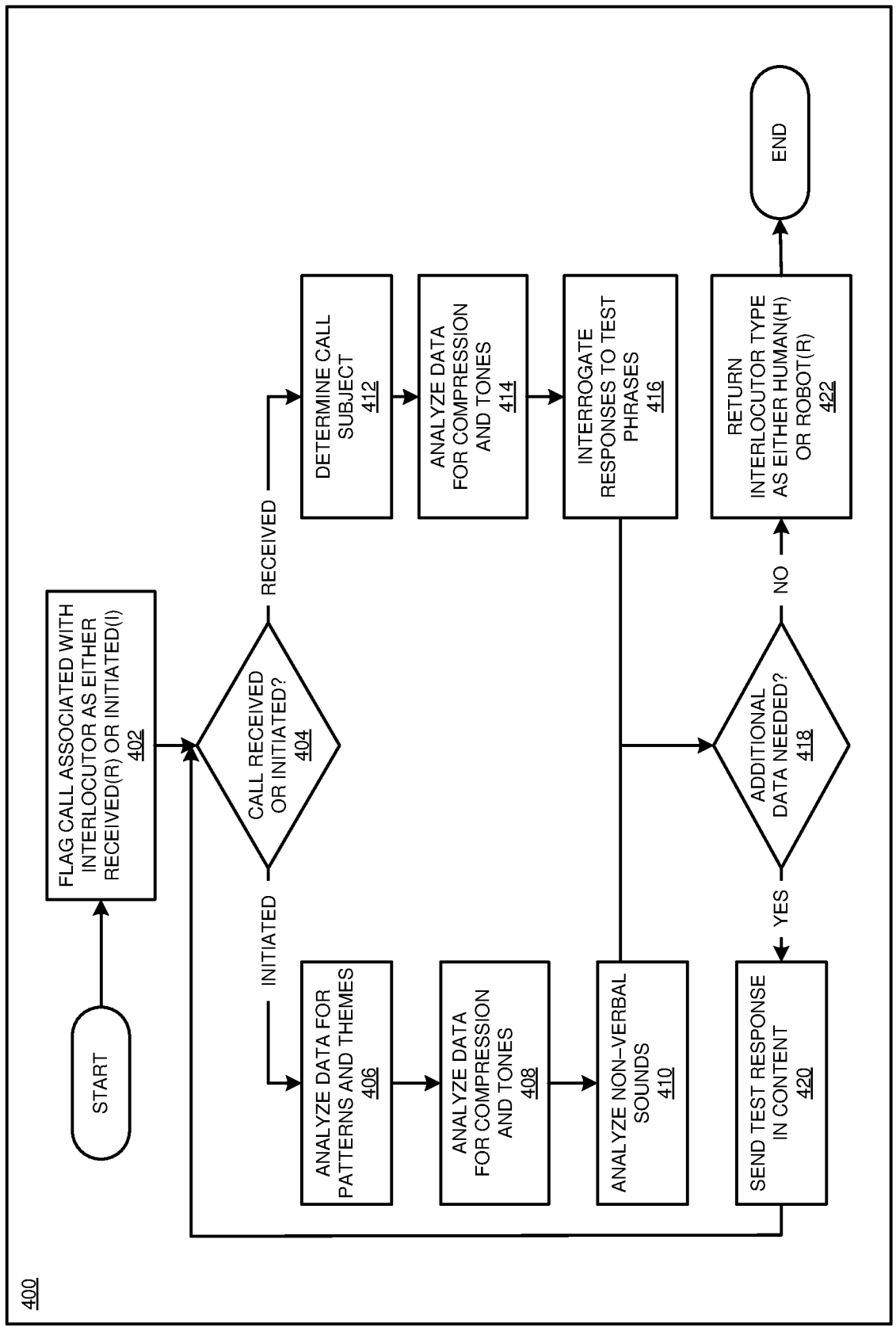
FIG. 4 depicts a flowchart of an example process for determining an interlocutor type during an interaction in accordance with an illustrative embodiment.

With reference to FIG. 4, this figure depicts a flowchart of an example process 400 for determining an interlocutor type during an interaction in accordance with an illustrative embodiment. In block 402, cognitive application 105 receives an indication of a call between an interlocutor and an interactive voice response (IVR) system (e.g., a machine) and flags the call associated with the interlocutor as either received (e.g., flag=R) by the IVR system or initiated (e.g., flag=I) by the IVR system. In block 404, cognitive application 105 determines whether the call is received or initiated based upon the flag. If the call is determined to be initiated, in block 406 cognitive application 302 analyzes data of the interaction for patterns and themes of the interaction of the interlocutor to determine if the interaction pattern and themes are indicative more of human interaction or a robotic device. In block 408, cognitive application 302 analyzes data of the interaction to determine a speech compression level and tones of the interaction to determine whether the speech compression level is indicative more of a human or robotic device. For example, a highly compressed speech compression level may be indicative of a human interlocutor while a constant level of interaction may be indicative of robotic device interlocutor. In block 410, cognitive application 302 analyzes non-verbal sounds in the environment of the interlocutor to determine if the sounds in the environment of the interlocutor are indicative more of a human interlocutor or a robotic device interlocutor. For example, background sounds that include sirens, background conversation, a baby crying, or a dog barking may be more indicative of a human interlocutor than a robotic device interlocutor. Process 400 then proceeds to block 418 as further described below.

If the call is determined to be received, in block 412 cognitive application 302 determines a call subject associated with the call such as whether the call is intended to be a support call or a sales call. In block 414, cognitive application 302 analyzes data of the interaction to determine a speech compression level and tones of the interaction to determine whether the speech compression level is indicative more of a human or robotic device. For example, a highly compressed speech compression level may be indicative of a human interlocutor while a constant level of interaction may be indicative of robotic device interlocutor. In block 416, cognitive application 302 presents test phrases to the interlocutor and analyzes the responses to the test phrases to determine whether the responses are indicative more of a human interlocutor or a robotic device interlocutor. Process 400 then proceeds to block 418.

In block 418, cognitive application 302 determines whether additional data is needed to make a determination of whether the interlocutor is a human or robotic device. If cognitive application 302 determines that additional data is needed, cognitive application 302 sends additional test responses including content intended to provoke responses from the interlocutor that facilitate determining that the interlocutor is either a human or a robotic device. For example, cognitive application 302 may ask the interlocutor to answer a question that would more likely to be known by a human than a robotic device to facilitate determining that the interlocutor is human.

If cognitive application 302 determines that no additional data is needed, cognitive application 302 returns the interlocutor type as either human (H) or a robotic device (R). Process 400 then ends.

Figure 5:
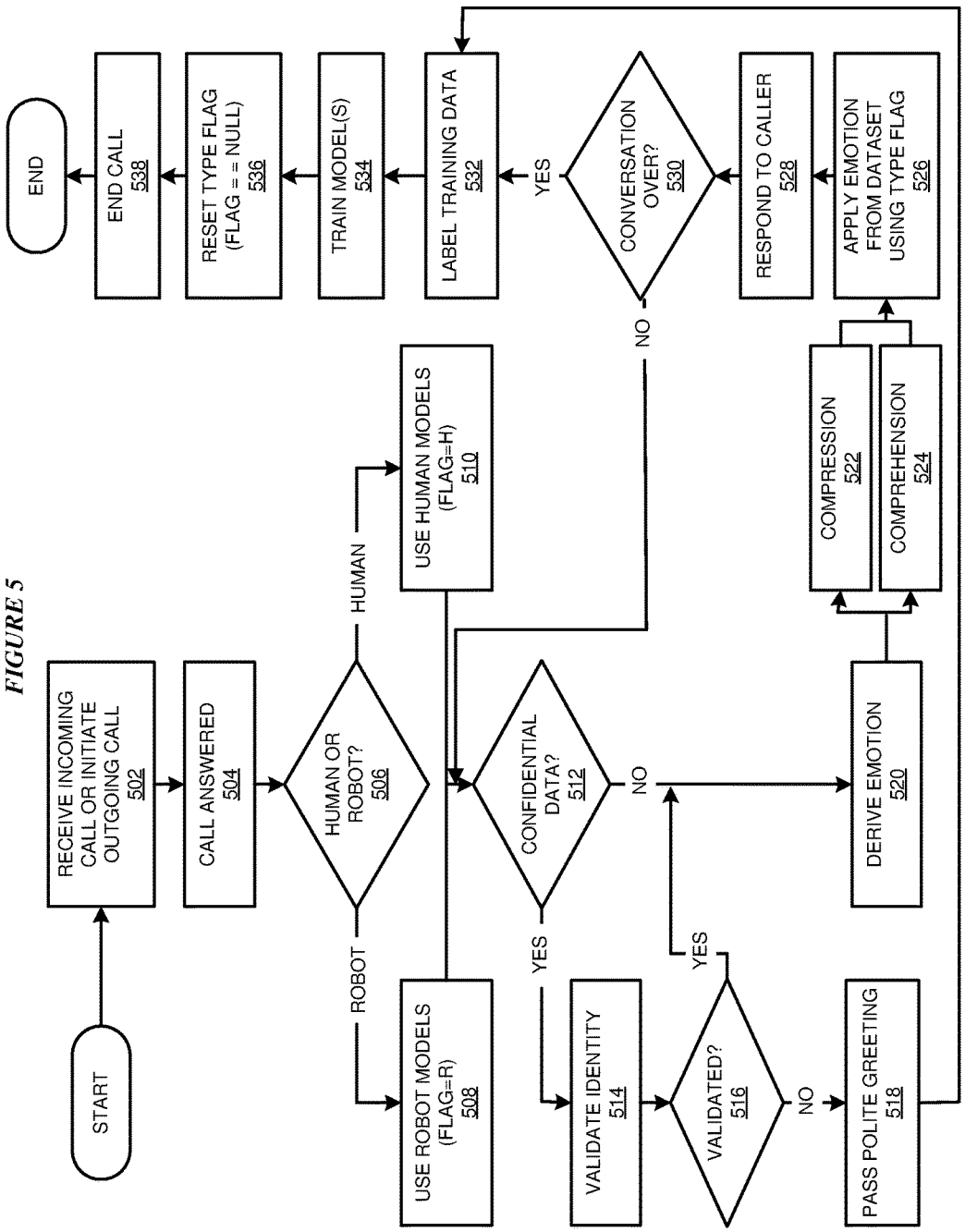
FIG. 5 depicts a flowchart of an example process for distributed machine-learned emphatic communication for machine-to-human and machine-to-machine interactions in accordance with an illustrative embodiment.

With reference to FIG. 5, this figure depicts a flowchart of an example process 500 for distributed machine-learned emphatic communication for machine-to-human and machine-to-machine interactions in accordance with an illustrative embodiment. In block 502, cognitive application 302 receives an incoming call from an interlocutor to a robotic device or initiates an outgoing call from a robotic device to an interlocutor. In a particular embodiment, cognitive application 302 may be installed an configured on a user device or a server, and the cognitive application may be configured to be granted access to data feeds and interlocutor wearables, additional microphones, video feeds, and other sources of data associated with an interlocutor.

In block 504, control component 310 of cognitive application 302 answers the call with a generic greeting and passes control to interlocutor type determination component 312. In block 506, interlocutor type determination component 312 of cognitive application 302 determines whether the interlocutor is a human or robotic device. In one or more embodiments, interlocutor type determination component 312 determines whether the interlocutor is a human or a robotic device using the process described with respect to FIG. 4.

If the interlocutor type is determined to be a robotic device (flag=R), in block 508 cognitive application 302 is configured to use one or more trained machine models tailored to robotic device interlocutors and process 500 continues to block 512. If the interlocutor type is determined to be a human (flag=H), in block 510 cognitive application 302 is configured to use one or more trained machine models tailored to human interlocutors and process 500 continues to block 512.

In block 512, cognitive application 302 determines whether confidential data is to be shared with the interlocutor. If cognitive application 302 determines that confidential information is to be shared with the interlocutor, process 500 continues to block 514. In block 514, identity validation component 314 of cognitive application 302 validates the identity of the interlocutor. In a particular embodiment, identity validation component 314 presents one or more security questions to the interlocutor to validate the interlocutor's identity such as requesting the last four digits of the interlocutor's social security number. If the identity of the interlocutor is not validated, in block 518 cognitive application 302 passes a polite greeting to the interlocutor indicating that the interlocutor has not been verified and process 500 continues to block 532. If the identity of the interlocutor is validated, process 500 continues to block 520.

In block 520, emotion derivation component 320 of cognitive application 302 determines one or more of the interlocutor's emotional state (e.g., anger, disgust, fear, joy, or sadness), social propensities (e.g., openness, conscientiousness, extroversion, agreeableness, or emotional range), and language styles (e.g., analytical, confident, or tentative). In block 522, compression rate determination component 318 of cognitive application 302 receives responses from the interlocutor during the interaction and determines a compression rate of the speech of the interlocutor. In block 524, comprehension determination component 316 of cognitive application 302 interrogates responses of the interlocutor during the interaction and determine an comprehension level value of the interlocutor based upon the interlocutor's responses.

In block 526, emotion application component 322 of cognitive application 302 receives the interlocutor type flag (H=human or R=robotic device) from interlocutor type determination component 312, the comprehension level from comprehension determination component 316, the compression rate of speech from compression rate determination component 318, and the emotional state from emotion derivation component 320, and determines one or more responses having empathy and with response patterns that will be best received by the interlocutor based upon the above inputs. In particular embodiments, each interlocutor type (e.g., human or robotic device) has unique response patterns and training data sets that are used to create the empathetic responses. In block 528, cognitive application 302 responds to the caller (e.g., interlocutor) using the one or more determined responses.

In block 530, cognitive application 302 determines if the conversation is over between the interlocutor and the robotic device. If the conversation is not determined to be over, process 500 returns to block 512. If the conversation is determined to be over, process 500 continues to block 532. In block 532, cognitive application 302 labels training data obtained during the interaction. In block 534, training component 324 trains one or more models using the labeled training data to allow data from the interaction to train the system to further refine the providing of a polite empathetic experience during future interactions with a user.

In block 536, cognitive application 302 resets the interlocutor type flag to a null value (flag==NULL). In block 538, cognitive application 302 ends the call with the interlocutor. Process 500 then ends.

Figure 6:
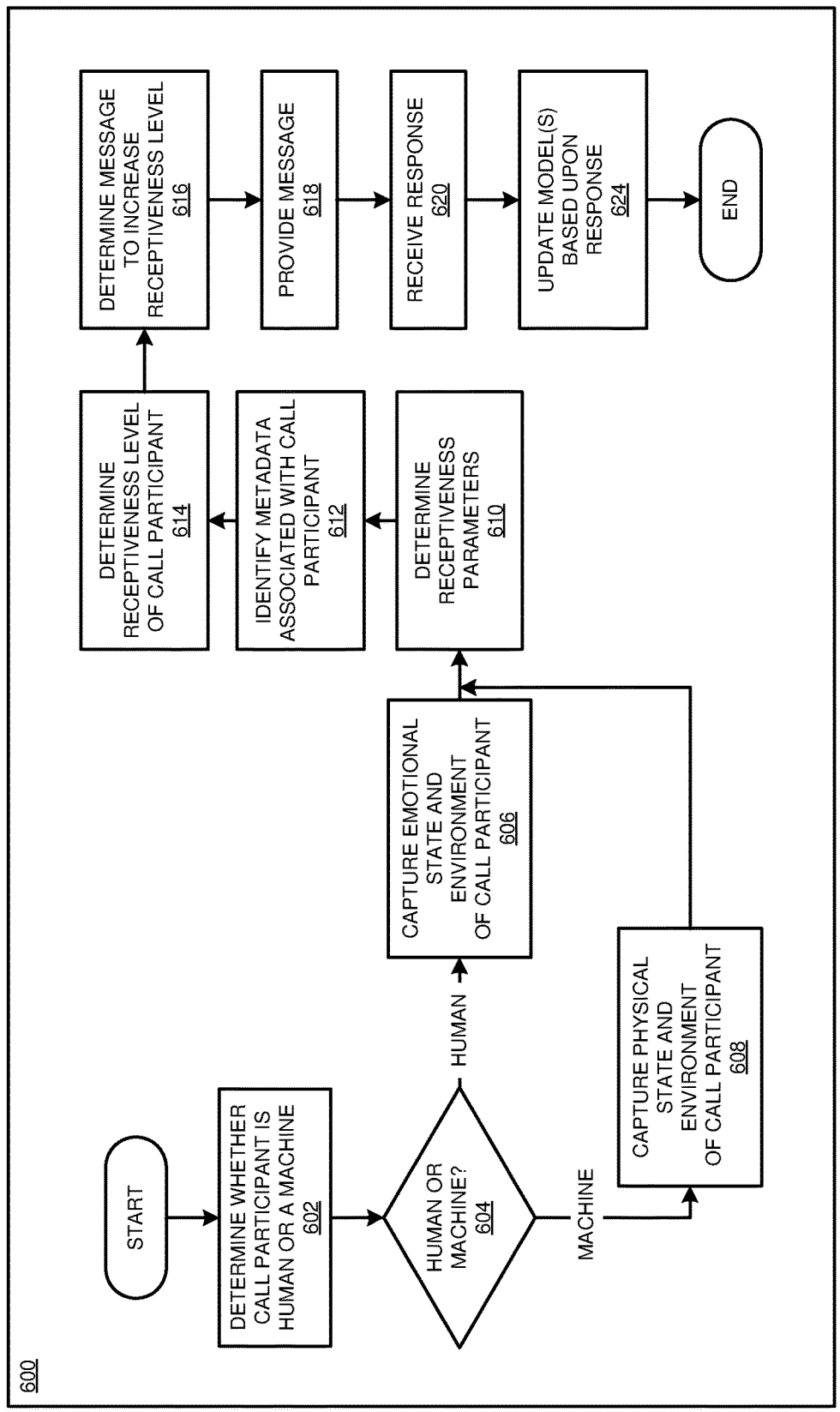
FIG. 6 depicts a flowchart of another example process for distributed machine-learned emphatic communication for machine-to-human and machine-to-machine interactions in accordance with an illustrative embodiment.

With reference to FIG. 6, this figure depicts a flowchart of another example process 600 for distributed machine-learned emphatic communication for machine-to-human and machine-to-machine interactions in accordance with an illustrative embodiment. In one or more embodiments, example process 600 tailors a message to a call participant based upon an emotional state of the call participant. In block 602, cognitive application 302 determines whether a call participant of a call between the call participant and a voice response system is a human or a machine and flags the call participant (e.g., an interlocutor) as either human or a machine. In block 604, cognitive application 302 determines whether the call participant is flagged as a human or machine. In block 606, responsive to determining that the call participant is a human, cognitive application 302 captures an emotional state and environmental information of the call participant. In one or more embodiments, the emotional state includes one or more of a mood, emotion, social propensity and language style of the call participant. In a particular embodiment, the environmental information is received from sensor devices located in an environment of the call participant such as wearables devices associated with the call participant, one or more microphones, and video feeds.

In block 608, responsive to determining that the call participant is a machine, cognitive application 302 captures a physical state and environmental information of the call participant. In particular embodiments, the physical state may include a physical condition of the machine such as an indication of an operative condition of one or more systems of the machine such as whether an arm of a robotic device is functioning properly.

In block 610, cognitive application 302 determines one or more receptiveness parameters for the call participant. In an embodiment, for a human call participant the receptiveness parameters include one or more of the emotional state and environmental information associated with the call participant. In an embodiment, for a machine call participant, the receptiveness parameters include one or more of the physical state of the call participant and the environmental information.

In block 612, cognitive application 302 identifies metadata associated with the call participant. In a particular embodiment, the metadata includes one or more of a location associated with the call participant or a time of day associated with the call.

In block 614, cognitive application 302 determines a receptiveness level of the call participant based upon the one or more receptiveness parameters and the metadata. In one or more embodiments, the one or more receptiveness parameters used to determine the receptiveness level includes the emotional state and the environmental information. In a particular embodiment, the receptiveness level is related to a predicted attention level, comprehension level and emotional level of the call participant.

In block 616, cognitive application 302 determines a message to the call participant based upon the receptiveness level and one or more machine-learned models. In one or more embodiments, the message is configured to likely increase the receptiveness level of the call participant. In particular embodiments, the configuring of the message includes one or more of modifying a word or phrase of an original message, modifying a volume level of the message, or modifying a tone of the message.

In block 618, cognitive application 302 provides the message to the call participant. In block 620, cognitive application 302 receives a response from the call participant. In block 624, cognitive application 302 updates the one or more machine-learned models based upon the response to the message. Process 600 then ends.

Thus, a computer implemented method, system or apparatus, and computer program product are provided in the illustrative embodiments for distributed machine-learned emphatic communication for machine-to-human and machine-to-machine interactions and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   determining if a call participant of a call between the call participant and a voice response system is a human or a machine;
   responsive to determining that the call participant is a human, determining an emotional state of the call participant;
   receiving environmental information of an environment associated with the call participant, wherein the environmental information includes background sound received from a microphone;
   determining a receptiveness level of the call participant based upon the emotional state and the environmental information including non-verbal auditory cues identified using sound recognition on the background sound received from the microphone; and
   determining a message to the call participant based upon the receptiveness level and one or more machine-learning models.

2. The computer-implemented method of claim 1, further comprising:
   receiving metadata associated with the call participant, wherein determining the receptiveness level is further based upon the metadata.

3. The computer-implemented method of claim 2, wherein the metadata includes one or more of a location associated with the call participant or a time of day associated with the call.

4. The computer-implemented method of claim 1, further comprising:
   providing the message to the call participant.

5. The computer-implemented method of claim 4, further comprising:
   receiving a response to the message from the call participant.

6. The computer-implemented method of claim 5, further comprising:
   updating the one or more machine-learning models based upon the response.

7. The computer-implemented method of claim 1, wherein the emotional state of the call participant includes one or more of a mood, an emotion, a social propensity or a language style of the call participant.

8. The computer-implemented method of claim 1, wherein the environmental information is received from one or more sensor devices located in the environment of the call participant, and
   wherein the determining if the call participant is human or machine is based at least in part on the environmental information.

9. The computer-implemented method of claim 8, wherein the one or more sensor devices includes one or more of a wearable device associated with the call participant, an audio sensing device, or a visual sensing device.

10. The computer-implemented method of claim 1, further comprising:
    responsive to determining that the call participant is a machine, determining a physical state of the call participant.

11. The computer-implemented method of claim 1, wherein the message is configured to likely increase the receptiveness level of the call participant.

12. The computer-implemented method of claim 11, wherein configuring the message includes one or more of modifying a word or phrase of an original message, modifying a volume level of the message, or modifying a tone of the message.

13. A computer usable program product comprising one or more computer-readable storage devices, and program instructions stored on at least one of the one or more storage devices, the stored program instructions comprising:
    program instructions to determine if a call participant of a call between the call participant and a voice response system is a human or a machine;
    program instructions to, responsive to determining that the call participant is a human, determine an emotional state of the call participant;
    program instructions to receive environmental information of an environment associated with the call participant, wherein the environmental information includes background sound received from a microphone;
    program instructions to determine a receptiveness level of the call participant based upon the emotional state and the environmental information including non-verbal auditory cues identified using sound recognition on the background sound received from the microphone; and
    program instructions to determine a message to the call participant based upon the receptiveness level and one or more machine-learning models.

14. The computer usable program product of claim 13, further comprising:
    program instructions to receive metadata associated with the call participant, wherein determining the receptiveness level is further based upon the metadata.

15. The computer usable program product of claim 14, wherein the metadata includes one or more of a location associated with the call participant or a time of day associated with the call.

16. The computer usable program product of claim 13, further comprising:
    program instructions to provide the message to the call participant.

17. The computer usable program product of claim 13, wherein the program instructions are stored in a computer readable storage device in a data processing system, and wherein the program instructions are transferred over a network from a remote data processing system.

18. The computer usable program product of claim 13, wherein the program instructions are stored in a computer readable storage device in a server data processing system, and wherein the program instructions are downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to determine if a call participant of a call between the call participant and a voice response system is a human or a machine;

program instructions to, responsive to determining that the call participant is a human, determine an emotional state of the call participant;

program instructions to receive environmental information of an environment associated with the call participant, wherein the environmental information includes background sound received from a microphone;

program instructions to determine a receptiveness level of the call participant based upon the emotional state and the environmental information including non-verbal auditory cues identified using sound recognition on the background sound received from the microphone; and program instructions to determine a message to the call participant based upon the receptiveness level and one or more machine-learning models.

20. The computer system of claim 19, the stored program instructions further comprising:

program instructions to receive metadata associated with the call participant, wherein determining the receptiveness level is further based upon the metadata.

* * * * *